Oct. 29, 1940.   R. NYDEN   2,219,486
CONTAINER
Filed Oct. 27, 1938
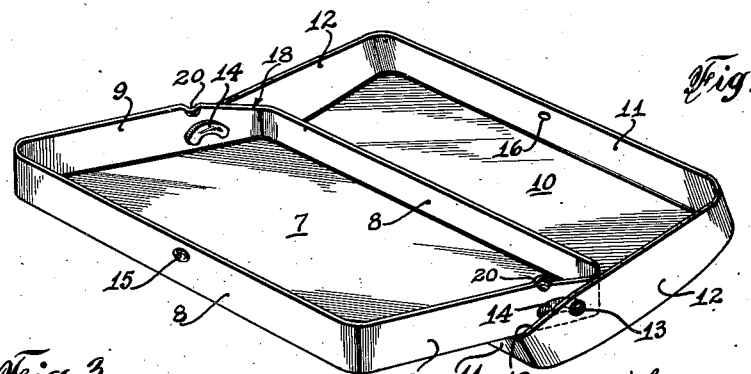
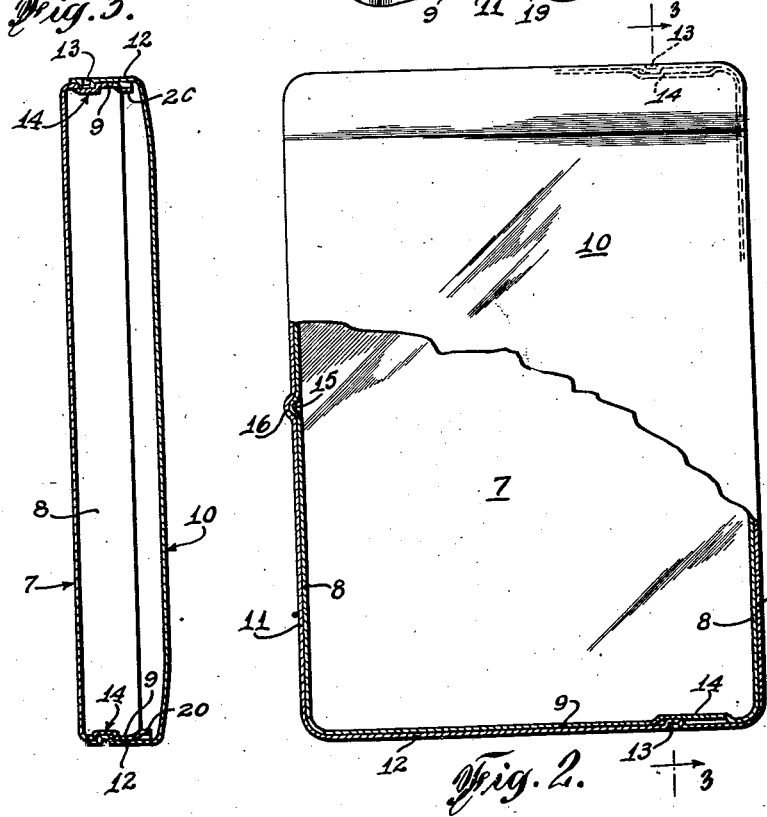
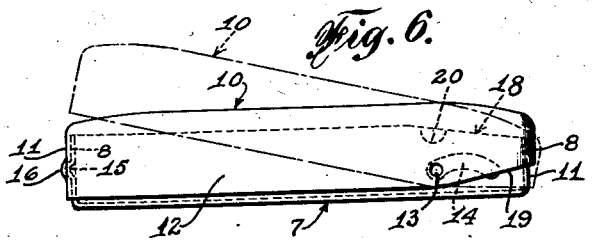
INVENTOR
Robert Nyden
BY
Rule & Hoge
ATTORNEYS Patented Oct. 29, 1940

2,219,486

UNITED STATES PATENT OFFICE 2,219,486

CONTAINER

Robert Nyden, Long Island City, N. Y.

Application October 27, 1938, Serial No. 237,228

2 Claims. (Cl. 220—36)

This invention relates to sheet metal containers of the type ordinarily employed for dispensing medicinal products, such as tablets, powder and other similar products. Such containers ordinarily include a shallow body and a cover having a depending flange embracing the side and end walls of the body, the cover being adapted to be slipped onto and off of the container body and being permanently hinged to the body by a pintle which passes through a series of knuckles formed on the rear side wall of the body and the cover flange. Cooperating means on the front side wall of the body and the cover flange serves to yieldingly retain the cover in closed position. To remove the cover it is necessary to grasp the container in one hand and then pry off the cover with the fingernail of the other hand and often considerable force is required to remove the cover, with the result that the container is jarred in the hands and the contents thereof is spilled.

The principal object of the invention is to provide an improved container of this character designed to overcome the above limitations by providing a container body and hinged cover therefor which are connected together in such a manner that when pressure is applied to the container adjacent the hinge on one side thereof, the other side will be released. Another object of the invention is to provide such a container in which the cover is hinged to the body by pin and groove connections in such a manner that upon opening of the container the rear end of the cover will pass around the rear end of the body and underlie the same to completely uncover the contents and facilitate access thereto.

Other objects of the invention will become apparent hereinafter.

In the accompanying drawing:

Fig. 1 is a perspective view of a container showing the cover in full open position;

Fig. 2 is a plan view of the container partly in section;

Fig. 3 is a sectional view taken substantially along the line 3—3 of Fig. 2;

Fig. 4 is a perspective view of a portion of the cover showing one of the pintles thereon;

Fig. 5 is a perspective view of a portion of the container showing one of the pintle receiving means thereon; and Fig. 6 is an end elevational view of the container showing in full lines the cover in its closed position and in broken lines the cover in its released position.

In carrying out the embodiment of the invention illustrated in the drawing, there is provided a body 7 of shallow oblong form having continuous vertical side and end walls 8 and 9 respectively and preferably rounded at the corners, and a cover 10 having continuous depending side and end flanges 11 and 12 respectively. The cover is of dome shape with the central portion thereof substantially flat.

The end flanges 12 of the cover and the end walls 9 of the body are arranged with means adapted to be engaged one with the other to connect and support the cover from the end walls 9 of the body and to permit the cover to have combined pivotal and sliding movement on the body. As shown, this means comprises aligned pivot or fulcrum projections 13 pressed inwardly from the material of the end flanges 12 of the cover 10, which projections are adapted to be received in a pair of arcuate recesses 14 formed in the end walls 9 of the body by pressing the material of the latter inwardly. The recesses 14 extend transversely of the body and are of upwardly curved arcuate form with the ends thereof terminating in the same common plane. The recesses 14 are arranged at one side of the longitudinal center of the container adjacent the rear side wall 8.

Detent means is provided to yieldingly retain the cover in closed position, and as shown, comprises a lug 15 pressed outwardly from the forward side wall 8 of the body, together with a cooperating socket 16 pressed outwardly from the forward cover flange 11.

The distance between the forward ends of the recesses 14 and the front side wall 8 is slightly less than the distance between the pivot projections 13 and the front cover side flange 11. Thus the cover closely fits the body at the forward side of the box and permits the front cover flange to be sprung over the lug 15 so that the latter may enter the socket 16.

Referring now to Fig. 6, the marginal edge portions of the end walls 9 of the body at the rear thereof are cut away to provide clearance portions 18 that reduce the height of the end walls in the vicinity of the hinge connections 13, 14. The cut away portions 18 extend from points just forwardly of the recesses 14 to the rear side wall 8. The height of the rear side wall 8 is reduced accordingly. Similarly, the marginal edge portions of the cover end flanges 12 are cut away at the rear thereof to provide clearance portions 19 while the height of the rear cover side flange 11 is correspondingly reduced.

To spring the retaining means 15, 16 and release the cover from the body, it is merely necessary to apply pressure by the thumb and finger of one hand to the rear side of the container. The projections 13, resting in the forward ends of the recesses 14, will act as pivot points for the cover 10 which will tilt upon the body 7. In addition to the pivotal movement of the cover 10 on the body 7, a slight bodily movement of the cover relative to the body 7 may be effected by swinging the front of the cover upwardly and rearwardly so that the cover passes completely around the rear side of the body and embraces one edge of the body as shown in Fig. 1.

To facilitate assembly of the cover 10 on the body 7 and to guide the projections 13 into the arcuate recesses 14, marginal indentations 20 are formed in the end walls 9 in the vicinity of the recesses 14 by pressing the material of the end walls 9 inwardly. These indentations are directed toward the recesses 14 although they do not communicate therewith and thus, while they may serve to guide the projections 13 into the recesses 14, they will not interfere with the normal shifting of the projections in the recesses.

Modifications may be resorted to within the spirit of the appended claims. For example, while the pivot or fulcrum projections 13 are shown as pressed inwardly from the cover flange and the arcuate recesses 14 as being formed in the end walls of the body, a reversal of these instrumentalities may be resorted to without departing from the spirit of the invention.

I claim:

1. In a sheet metal container, a body including a bottom, a pair of end walls, front and rear walls, said rear wall and adjacent portions of the end walls being reduced in height, each end wall having an elongated upwardly curved channel disposed substantially horizontally in its exterior surface in that region which is reduced in height, a cover including a top, end walls, a front wall and a rear wall, said rear wall and adjacent portions of the end walls being reduced in height and a hinge pin projecting inwardly from each end wall of the cover into the corresponding channel, the pins and channels being so relatively positioned that each pin is in the forward end of the corresponding channel while the container is closed and in the opposite end of the channel when the container is completely opened.

2. In a sheet metal container, a body including a bottom, a pair of end walls, front and rear walls, said rear wall and adjacent portions of the end walls being reduced in height, each end wall having an elongated upwardly curved channel disposed substantially horizontally in its exterior surface in that region which is reduced in height, a cover including a top, end walls, a front wall and a rear wall, said rear wall and adjacent portions of the end walls being reduced in height and a hinge pin projecting inwardly from each end wall of the cover into the corresponding channel, the pins and channels being so relatively positioned that each pin is in the forward end of the corresponding channel while the container is closed and in the opposite end of the channel when the container is completely opened, each end wall of the body having a generally vertical groove substantially directly above the inner end of the corresponding channel to assist in guiding the hinge pins into the channels during assembly of the cover and body.

ROBERT NYDEN.